(12) United States Patent
Nakajima et al.

(10) Patent No.: US 6,643,348 B2
(45) Date of Patent: Nov. 4, 2003

(54) STEAM TURBINE CONTROL DEVICE OF NUCLEAR POWER PLANT

(75) Inventors: Masayuki Nakajima, Kanagawa-ken (JP); Yutaka Yokota, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/793,101

(22) Filed: Feb. 27, 2001

(65) Prior Publication Data

US 2002/0075985 A1 Jun. 20, 2002

(30) Foreign Application Priority Data

Feb. 29, 2000 (JP) ........................................ 2000-054608

(51) Int. Cl.[7] ................................................ G21C 7/32
(52) U.S. Cl. ........................ 376/210; 376/211; 60/660
(58) Field of Search ................... 376/210, 247, 376/211; 60/660

(56) References Cited

U.S. PATENT DOCUMENTS 3,630,839 A * 12/1971 Podolsky .................... 376/217
4,658,590 A * 4/1987 Higashi et al. ............... 60/660
5,268,939 A * 12/1993 Tang et al. .................. 376/210
5,293,411 A * 3/1994 Miyamoto et al. ........... 376/210

FOREIGN PATENT DOCUMENTS

JP 59-180497 10/1984
JP 9-80195 * 3/1997

* cited by examiner

*Primary Examiner*—Michael J. Carone
*Assistant Examiner*—Rick Palabrica
(74) *Attorney, Agent, or Firm*—Finnegan, Henderson, Farabow, Garrett & Dunner, L.L.P.

(57) ABSTRACT

A steam turbine control device. A main steam system runs between a nuclear reactor and a steam turbine and includes a main steam isolation valve (MSIV), a main steam control valve, and a turbine by-pass system with a turbine by-pass valve A calculating means generates a main steam pressure control signal and a reactor dome pressure control signals. A pressure control signal changeover means changes a pressure control signal from the reactor dome pressure signal to the main steam pressure signal when the MSIV closes to restrain the abrupt decrease of steam in the main steam system effectively.

5 Claims, 10 Drawing Sheets

THE TIME MAIN STEAM ISOLATION VALVES CLOSE

REACTOR DOME PRESSURE (OUTPUT OF REACTOR DOME PRESSURE DETECTOR 11)

MAIN STEAM PRESSURE (OUTPUT OF MAIN STEAM PRESSURE DETECTOR 26)

FIG. 10b

REACTOR DOME PRESSURE CONTROL SIGNAL 36

FIG. 10c

PRESSURE CONTROL SIGNAL 29 (POSITION OF MAIN STEAM CONTROL VALVE 6)

POSITION OF TURBINE BY-PASS VALVE 7

STEAM TURBINE CONTROL DEVICE OF NUCLEAR POWER PLANT

BACKGROUND OF THE INVENTION

1. Field of the Invention

The present invention relates to steam supply in a nuclear power plant. Steam moves from a nuclear reactor to a steam turbine through a main steam system with main steam isolation valves for isolating the nuclear reactor.

2. Description of the Related Art

Figure 8:
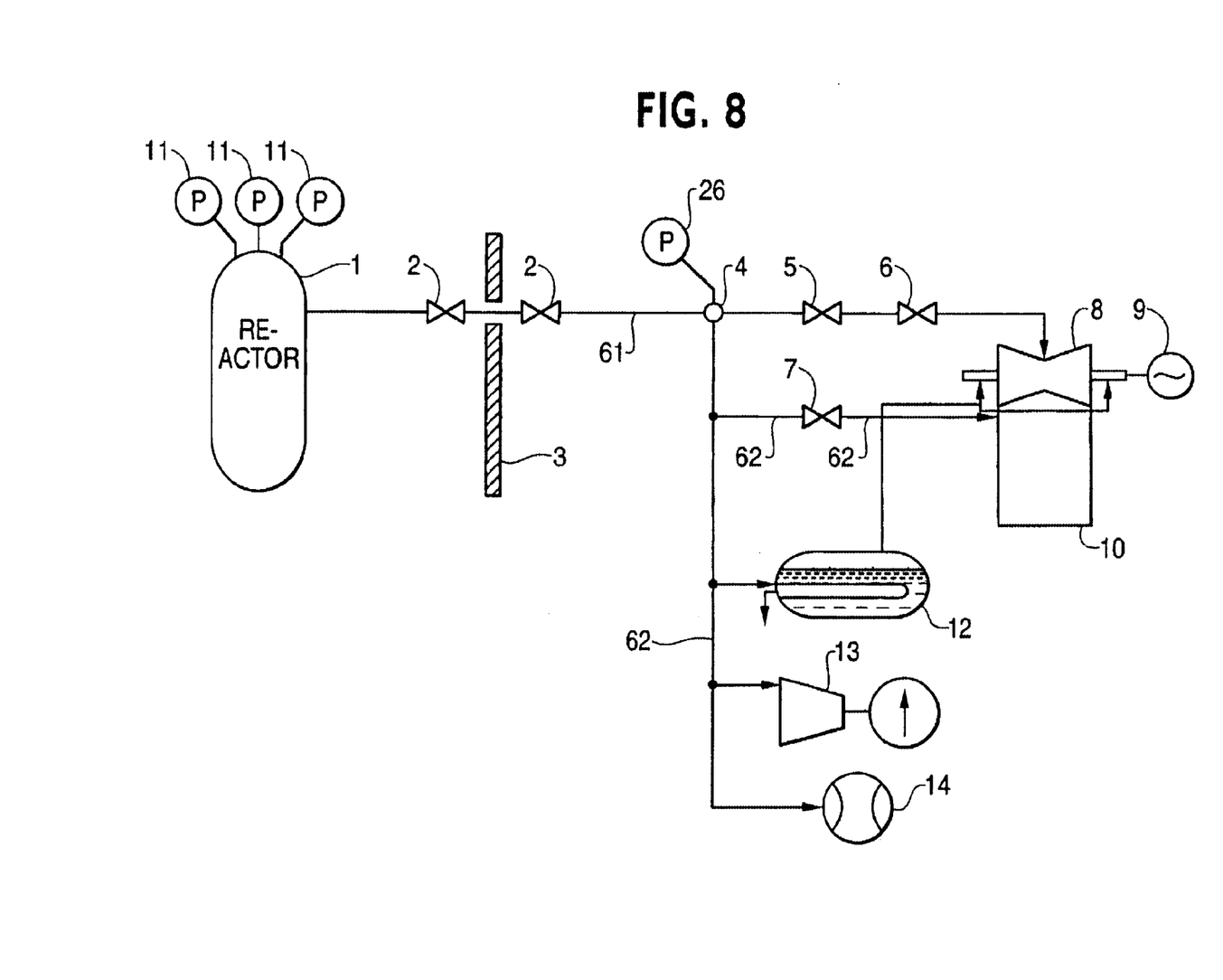
FIG. 8 is a system diagram of a main steam system and the turbine by-pass system of the nuclear power plant concerning this invention or the related art.

Japanese Non-examined Patent Publication No. 9-80195 discloses a steam turbine control device for a nuclear power plant. FIG. 8 is a basic block diagram of the main steam system and a turbine by-pass system of a nuclear power plant.

Steam generated in a nuclear reactor 1 is supplied to a steam turbine 8 through a main steam system 61. There are a plurality of, for example ten, main steam isolation valves (MSIV) 2 settled inside and outside of a primary containment vessel (PCV) 3 containing a nuclear reactor 1, and a main steam header 4, a main steam stop valve 5, and a main steam control valve (CV) 6, in the main steam system 61.

The main steam isolation valves 2 operate independently from other pressure control valves to isolate the nuclear reactor 1. The main steam isolation valves 2 are open in the usual state of operation, and close to automatically seal the inside and outside of the primary containment vessel 3 when there is possibility that reactor coolant may flow out of the primary containment vessel 3. The main steam isolation valves 2 thus close, for example, if an accident internal or external of the primary containment vessel 3 arises.

The main steam stop valve 5 blocks the steam from reaching a steam turbine 8 when suspending the steam turbine 8. The main steam control valve 6 adjusts the discharge of steam that is generated in the nuclear reactor 1 and that flows into the steam turbine 8. The steam then rotates the steam turbine 8, and a generator 9, directly linked with the steam turbine 8, generates an electric output A turbine by-pass system 62, independent of the main steam system 61, branches from the main steam system 61 at the main steam header 4 and connects to a condenser 10 via the turbine by-pass valve 7.

A steam system supplies drive steam for a turbine gland steam evaporator 12, a reactor feed water pump turbine 13, and a steam jet air ejector 14, from the main steam system 61. The turbine gland steam evaporator 12 supplies a little steam to the space of a gland sealing part of the steam turbine 8, i.e., the boundary portion with the open air, in order to seal the gland part of a turbine 8. The steam jet air ejector 14 continuously extracts noncondensing gases, such as hydrogen and oxygen, from air in a condenser 10 or in exhaust gas of the steam turbine 8. The steam jet air ejector performs an action like spraying the steam supplied from the turbine by-pass system 62 and sends the noncondensing gas to an off-gas system and thereby maintains the vacuum of the condenser 10.

During normal operation, the main steam control valve 6 adjusts the reactor dome pressure, when a reactor dome pressure detector 11, installed in the nuclear reactor 1, detects the reactor dome pressure. A turbine by-pass valve 7 is kept completely closed then.

If an accident occurs at a startup or a shutdown of the nuclear power plant, or a electric transmission system, the position of the main steam control valve 6 is restricted, and the turbine by-pass valve 7 adjusts the pressure of the nuclear reactor 1.

Figure 9:
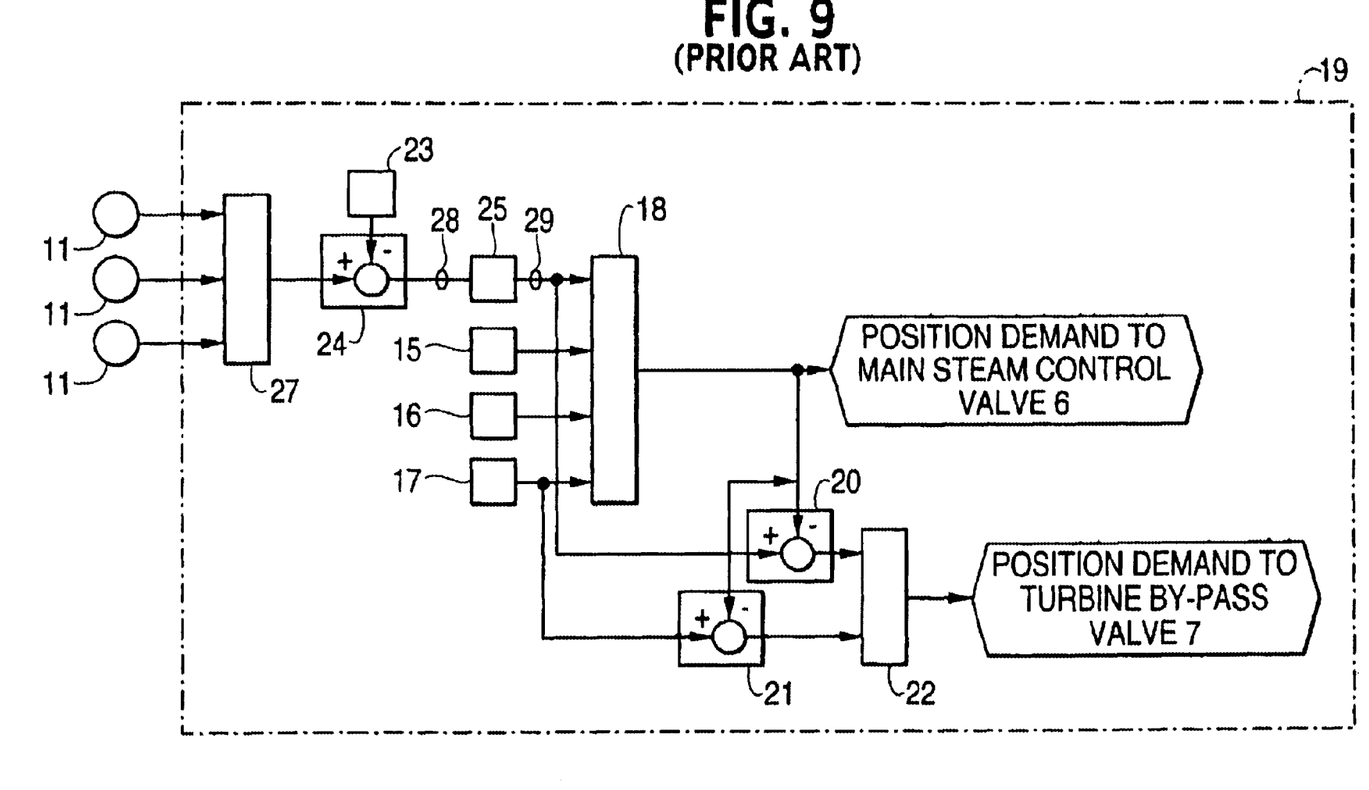
FIG. 9 is a block flow diagram showing an example of a conventional steam turbine control device of a nuclear power plant.

FIG. 9 is a block diagram for explaining the conventional example of the steam turbine control device of the nuclear power plant of FIG. 8.

The steam turbine control device described below controls the positions of the main steam control valve 6 and the turbine by-pass valve 7.

A reactor dome pressure signal from the reactor dome pressure detector 11 is inputted into the steam turbine control device 19 and is compared with the pressure setting of the reactor dome pressure setter 23. A first pressure deviation calculating unit 24 then calculates the pressure deviation. A reactor dome pressure control calculating unit 25 receives the pressure deviation calculated by the first pressure deviation calculating unit 24 and sends a signal proportional to the deviation as a pressure control signal 29 to a first low value selector 18.

The first low value selector 18 compares the pressure control signal 29 to a speed/load control signal from a speed/load control calculating unit 15, a load restriction signal of a load limiter 16, and a maximum discharge restriction signal from a maximum discharge restriction unit 17. The speed/load control signal from the speed/load control calculating unit 15 controls the speed, i.e., the rotational number of the steam turbine 8, and the load of the generator 9, i.e., the electric output. The first low value selector 18 then chooses the lowest value signal among these signals and outputs it as a position demand of the main steam control valve 6.

Moreover, a first deviation calculating unit 20 generates the deviation signal between the pressure control signal 29 calculated by the reactor dome pressure control calculating unit 25 and the position demand signal to the main steam control valve 6. A second deviation calculating unit 21 generates the deviation signal between the maximum discharge restriction signal calculated by the maximum discharge restriction unit 17 and the position demand of the main steam control valve 6. The two deviation signals from the first and second deviation calculating units 20, 21 are inputted into the second low value selector 22, which outputs the lower value of the two deviation signals as a position demand signal of the turbine by-pass valve 7.

In addition, the reactor dome pressure detectors 11 are generally multiplexed to improve reliability, and in FIG. 9, a first medium value selector 27 selects a medium value of the triplex reactor dome pressure detectors 11 as a signal to be used for control.

In the conventional steam turbine control device of the nuclear power plant described above, in a usual operating state, the main steam control valve 6 is adjusted, based on the pressure signal from the reactor dome pressure detectors 11 installed in the nuclear reactor 1, to control and fix the pressure of the nuclear reactor 1. But in that case, if an accident detected by, for example, a reactor isolation signal detector (not shown) inside or outside of the primary containment vessel 3 occurs, and if the main steam isolation valves 2 are automatically in a fully closed position at the time of the accident, the pressure of the nuclear reactor 1, i.e., the reactor dome pressure, will rise abruptly.

Figure 10A:
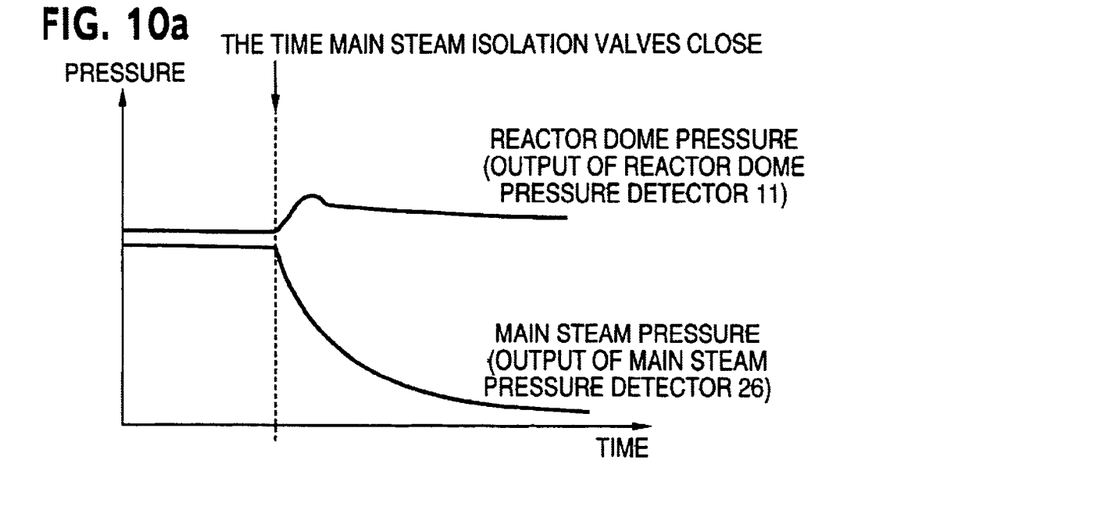
FIG. 10 is a signal time chart of signals for explaining the problem of the conventional steam turbine control system shown in FIG. 9.
Figure 10B:
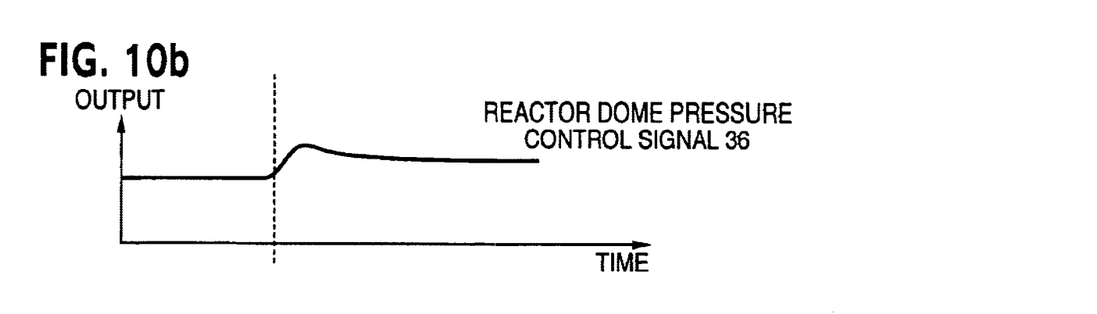
Figure 10C:
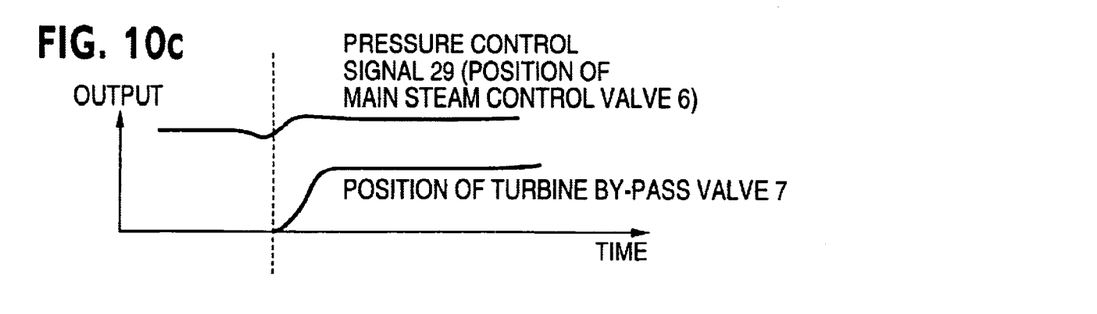

In this case, the main steam control valve 6 and the turbine by-pass valve 7 open, and the drive steam of the turbine gland steam evaporator 12, the reactor feed water pump turbine 13, and the steam jet air ejector 14 decrease abruptly. FIGS. 10a–10c are signal time charts for explaining this situation.

If the main steam isolation valves 2 in FIG. 8 are fully closed, the pressure signal from the reactor dome pressure detectors 11 installed in the nuclear reactor 1 goes up as shown in FIG. 10a. In FIG. 10a, the ordinate axis shows pressure and the abscissa axis shows time.

Since at that time the pressure deviation which is the output of the first pressure deviation calculating unit 24 of the steam turbine control device 19 rises, the pressure control signal 29 calculated by the reactor dome pressure control calculating unit 25 goes up as shown in FIG. 10c In FIG. 10c, the ordinate axis shows an output of the signal and the abscissa axis shows time. The output of the first low value selector 18 goes up until it is restricted by either the speed/loadcontrol signal, the load restriction signal, or the maximum discharge restriction signal. Then, the main steam control valve 6 will open according to an increase of the pressure control signal 29.

On the other hand, if the first low value selector 18 restricts the pressure control signal 29, the position demand signal to the main steam control valve 6 also becomes restricted, and the deviation signal between the pressure control signal 29 and the position demand signal to the main steam control valve 6 calculated by the first deviation calculating unit 20 goes up.

Therefore, since the output of the second low value selector 22 goes up until it is restricted by the deviation signal between the pressure control signal 29 and the maximum discharge restriction signal calculated by the second deviation calculating unit 21, the position demand signal to the turbine by-pass valve 7 goes up as shown in FIG. 10c, and the turbine by-pass valve 7 will open.

FIG. 10b is a signal time chart of the reactor dome pressure control signal 36. In FIG. 10b, the ordinate axis shows the output of the signal and the abscissa axis shows time.

If the main steam control valve 6 and the turbine by-pass valve 7 open as mentioned above, since the steam remaining in the main steam system 61 downstream of the main stream isolation valves 2 flow into the steam turbine 8 or are directly collected by the condenser 10, the drive steam of the turbine gland steam evaporator 12, the reactor feed water pump turbine 13, and the steam jet air ejector 14, i.e., main steam pressure, goes down abruptly, as shown in FIG. 10a.

Under the circumstance, the heating steam of the turbine gland steam evaporator 12 may lose, the amount of supply of the gland seal steam from the turbine gland steam evaporator 12 to the steam turbine 8 may fall in a short time, and this situation may damage the steam turbine 8.

The vacuum drop of a condenser 10 becomes comparatively greater by rapid reduction of the drive steam of the steam jet air ejector 14, because the ability of steam jet air ejector 14 to discharge the noncondensing gas goes down then.

SUMMARY OF THE INVENTION

In view of the foregoing, it is an object of this invention to provide a steam turbine control device and the method for a nuclear power plant.

This object can be achieved according to the present invention by providing, in one aspect, a steam turbine control device of nuclear power plant including:
a main steam system connected to lead steam generated in a nuclear reactor into a steam turbine, comprising a main steam line, a main steam isolation valve, and a main steam control valve;
a turbine by-pass system connected to by-pass the steam turbine, branched from the main steam system, and connected to a condenser, the turbine by-pass system comprising a turbine by-pass valve;
a main steam pressure detector in the main steam system;
a main steam pressure control calculating means for outputting a main steam pressure control signal dependant on the signal from the main steam pressure detector;
a reactor dome pressure detector in the nuclear reactor;
a reactor dome pressure control calculating means for outputting a reactor dome pressure control signal dependant on the signal from the reactor dome pressure detector;
a main steam isolation valve fully closed position detector for outputting a pressure control change trigger signal when the main steam isolation valve is detected to be fully closed; and
a pressure control signal calculating means for outputting a pressure control signal to control the position of the main steam control valve and/or the turbine by-pass valve comprising a pressure control signal changeover means to change over a pressure control signal from the reactor dome pressure control signal to the main steam pressure control signal when the main steam isolation valve is detected to be closed by the main steam isolation valve fully closed position detector.

In another aspect, in a nuclear power plant including a main steam isolation valve in a main steam system between a nuclear reactor and a steam turbine, there is provided a control device for controlling at least one of a first valve and a second valve, the first valve being in the main steam system and the second valve being in a steam turbine by-pass system branched from the main steam system, the control device including:
a first pressure monitor connected to the nuclear reactor;
a main steam isolation valve position monitor connected to the main steam isolation valve;
a second pressure monitor connected to the main steam system between the first valve and the main steam isolation valve;
a control means for controlling the position of the first valve or the second valve based on a first pressure signal from the first pressure monitor during normal operation of the nuclear reactor, and based on a second pressure signal from the second pressure monitor when the second pressure monitor detects that the main steam isolation valve is closed.

In another aspect, in a nuclear power plant including a nuclear reactor in a primary containment vessel, a steam turbine, and a main steam system between the nuclear reactor and the steam turbine, there is provided a method for controlling the steam turbine based on the position of a main steam isolation valve in the main steam line, the method including the steps of:
monitoring the pressure in the nuclear reactor when the main steam isolation valve is open;
closing the main steam isolation valve to isolate the primary containment vessel;
monitoring the pressure in the main steam system downstream of the main steam isolation valve when the main steam isolation valve is closed; and
controlling the amount of the supply of the steam to the steam turbine only in response to the pressure in the main steam system downstream of the main steam isolation valve when the main steam isolation valve is closed.

BRIEF DESCRIPTION OF THE DRAWINGS

Other objects and aspects of the present invention will become apparent from the following description of an embodiment with reference to the drawings in which:

FIGS. 2a–2c are signal time charts of signals for explaining the function and effect of the first embodiment of the invention described in FIG. 1.

DETAILED DESCRIPTION OF THE PREFERRED EMBODIMENTS

Embodiments of the steam turbine control device of the nuclear power plant concerning this invention are explained below. Referring now to the drawings, wherein like reference characters designate like or corresponding parts throughout the several views.

Figure 1:
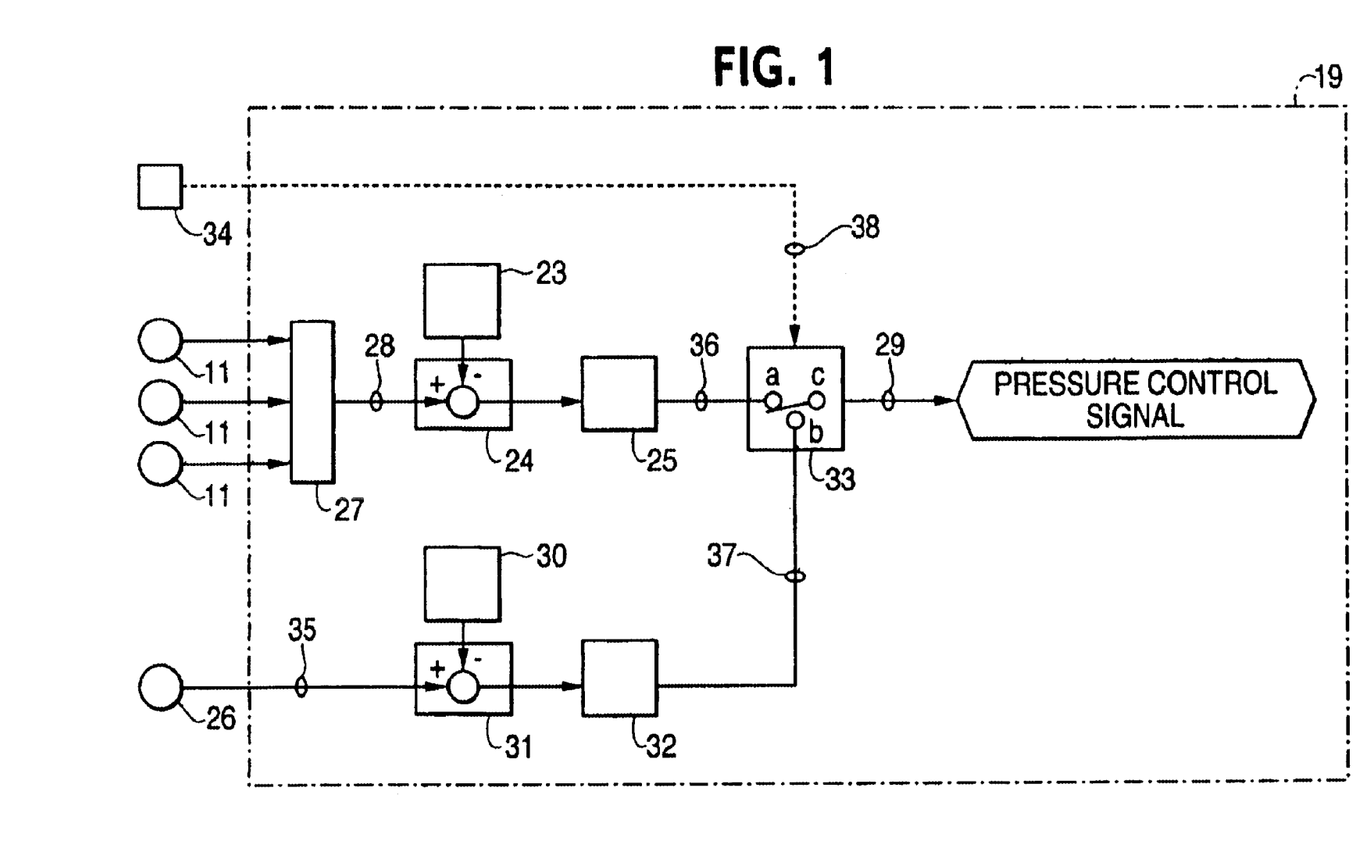
FIG. 1 is a block flow diagram of a steam turbine control device of a nuclear power plant according to a first embodiment of the invention.

FIG. 1 is a block flow diagram showing a first embodiment of the present invention. In this embodiment, a steam turbine control device 19 has a control means to restrain a fall of the main steam pressure, ie., the pressure of the main steam header 4 or the main steam system 61, when the main steam isolation valves 2 are closed. A changeover means changes over, as a pressure control signal, from the reactor dome pressure control signal side to the main steam pressure control signal side when the main steam isolation valves 2 are closed.

A second pressure deviation calculating unit 31 calculates with the main steam pressure signal 35 from the main steam pressure detector 26 installed in the main steam header 4 or the main steam system (main steam line) 61 as shown in FIG. 8 and the signal from a main steam pressure setter 30.

A main steam pressure control calculating unit 32 calculates the pressure deviation signal from the second pressure deviation calculating unit 31 and outputs the main steam pressure control signal 37.

A main steam isolation valve fully closed position detector 34 detects that the main steam isolation valve 2 that isolates the main steam system from the nuclear reactor 1 is fully closed.

A pressure control signal changeover unit 33 changes over the pressure control signal 29 from the reactor dome pressure control signal 36 to the main steam pressure control signal 37 when the main steam isolation valves 2 are fully closed. That is, when the pressure control signal changeover unit 33 receives the pressure control change trigger signal 38 from the main steam isolation valve fully closed position detector 34, the connection state of the pressure control signal changeover unit 33 is changed over from between a–c to between b–c, and then the signal outputted as the pressure control signal 29 from the pressure control signal changeover unit 33 is changed over from the reactor dome pressure control signal 36 to the main steam pressure control signal 37.

Since some of the physical structure in this embodiment may be similar to the conventional structure shown in FIG. 9, the same reference characters are given to the same composition.

Figure 2A:
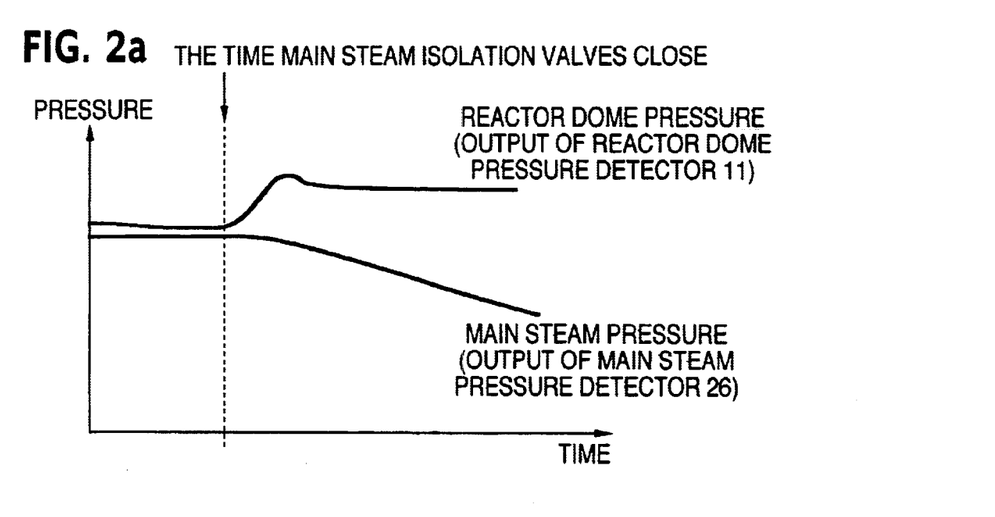
FIG. 2a shows a chart of reactor dome pressure and main steam pressure.
Figure 2B:
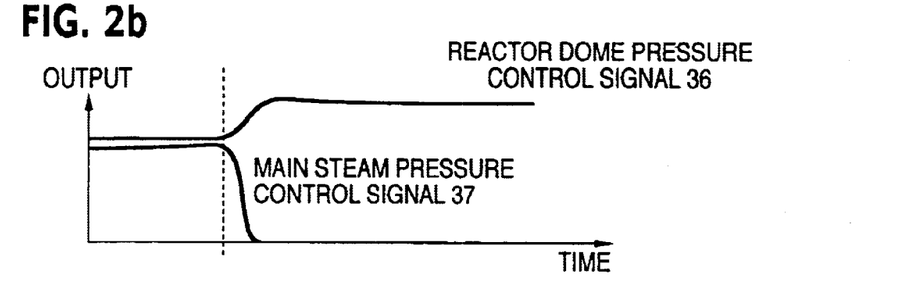
FIG. 2b shows a signal time chart of a reactor dome pressure control signal 36 and a main steam pressure control signal 37.
Figure 2C:
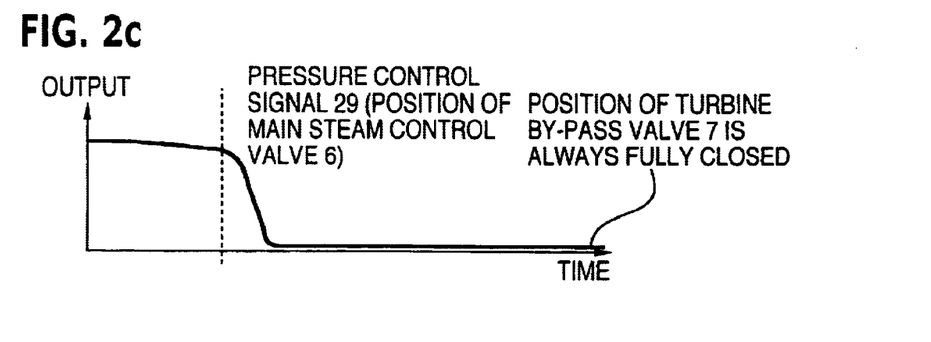
FIG. 2c shows a signal time chart of a pressure control signal 29 that determines the position of the main steam control valve 6.

FIGS. 2a–2c are signal time charts for explaining the function and effect of the first embodiment acquired by constituting as shown in FIG. 1 mentioned above. FIG. 2a shows a signal time chart of the rector dome pressure and the main steam pressure.

As shown in FIG. 2a, if the main steam isolation valves 2 are fully closed and the pressure control signal 29 is changed over to the main steam pressure control signal 37 by the pressure control signal changeover unit 33, the main steam pressure detected by the main steam pressure detector 26 below the main steam isolation valves 2 falls according to the loss of steam supply, so the main steam pressure control signal 37 calculated by the main steam pressure control calculating unit 32 using the deviation signal between the main steam pressure signal and the signal from the main steam pressure setter 30 becomes zero or less. Therefore, the pressure control signal 29 denotes fully closed position command, that is, the main steam control valve 6 and the turbine by-pass valve 7 are thus closed.

At this time, the steam flow into the steam turbine 8 or the condenser 10 is lost, and a rapid reduction of the steam that remains in the main steam system 61 downstream of the main steam isolation valves 2 can be prevented, as shown in FIG. 2a. Therefore, the steam remaining in the main steam system 61 is supplied to the turbine gland steam evaporator 12 as its heating steam, and a fall in the amount of supply of the gland sealing steam from the turbine gland steam evaporator 12 to the steam turbine 8 can be restrained.

Moreover, in this embodiment, a rapid reduction of the drive steam of the steam jet air ejector 14 is prevented, and the vacuum drop in the condenser 10 can be restrained in an action like an atomizer by the steam flow into the steam jet air ejector 14.

Consequently, the concept of this embodiment can be applied easily to any plant, even if it is an established conventional plant, without troubles concerned to the fully closed position of the main steam isolation valves 2.

In addition, FIG. 2b shows a signal time chart of the reactor dome pressure control signal 36 and the main steam pressure control signal 37, and FIG. 2c shows a signal time chart of the pressure control signal 29 that determines the position of the main steam control valve 6.

Figure 3:
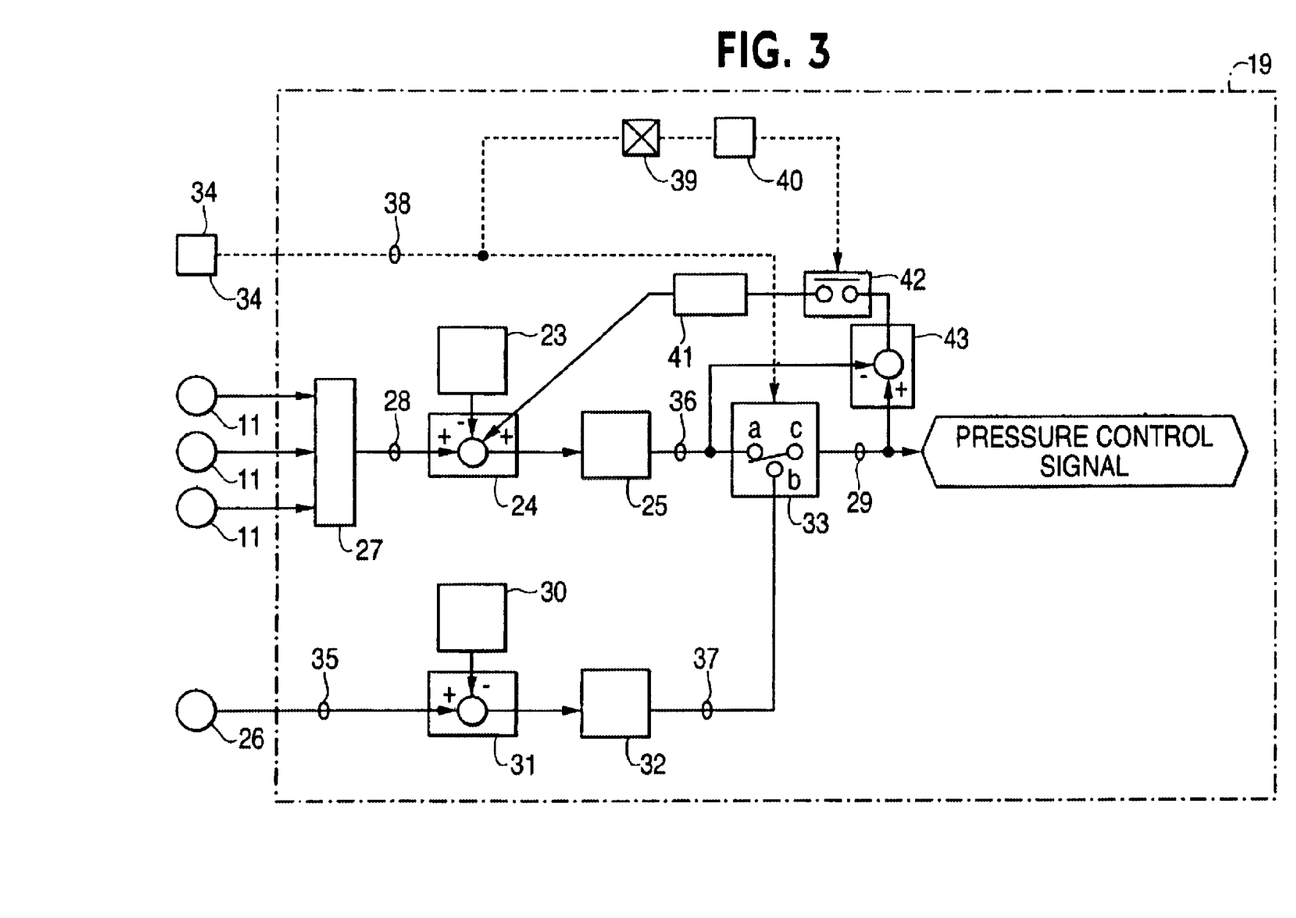
FIG. 3 is a block flow diagram of a steam turbine control device of a nuclear power plant according to a second embodiment of the invention.

FIG. 3 is a block flow diagram showing a second embodiment of the present invention In this embodiment, the steam turbine control device as mentioned in the first embodiment shown in FIG. 1 has an additional control means to restrain the abrupt change at the time of the changeover of a pressure control signal from the main steam pressure control signal 37 to the reactor dome pressure control signal 36 when the signal of the main steam isolation valve fully closed position detector 34 is cancelled.

In the steam turbine control device, a pressure control deviation calculating unit 43 calculates the deviation between the reactor dome pressure control signal 36 and the pressure control signal 29. A NOT circuit (logic reversal circuit) 39 outputs a signal when the pressure control change trigger signal 38 from the main steam isolation valve fully closed position detector 34 is in a OFF state. A one-shot circuit 40 outputs a signal in an instant when an output arises from the NOT circuit 39. A relay contact 42 closes in an instant when the signal from the one-shot circuit 40 is outputted, and a bias signal generator 41, in the case that a signal is inputted, outputs a signal whose initial value is the value of the inputted signal and that decreases by a certain rate of change.

The signal from the bias signal generator 41 is inputted to the first pressure deviation calculating unit 24 as an additive signal, and then the output of the first pressure deviation calculating unit 24 becomes the deviation signal added a bias.

In this embodiment, the abrupt change of the pressure control signal 29 may be restrained when the pressure control signal 29 returns to the reactor dome pressure control signal 36 by the pressure control signal changeover unit 33.

Figure 4A:
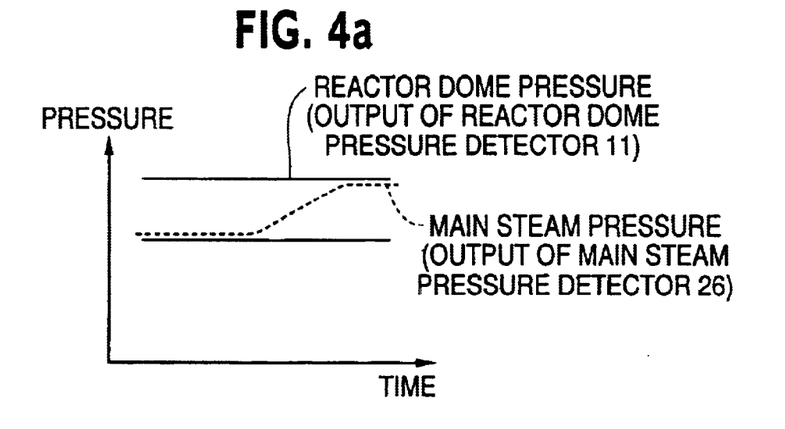
FIG. 4a is a chart of reactor dome pressure and main steam pressure for explaining the function and effect of the second embodiment of the invention described in FIG. 3.
Figure 4B:
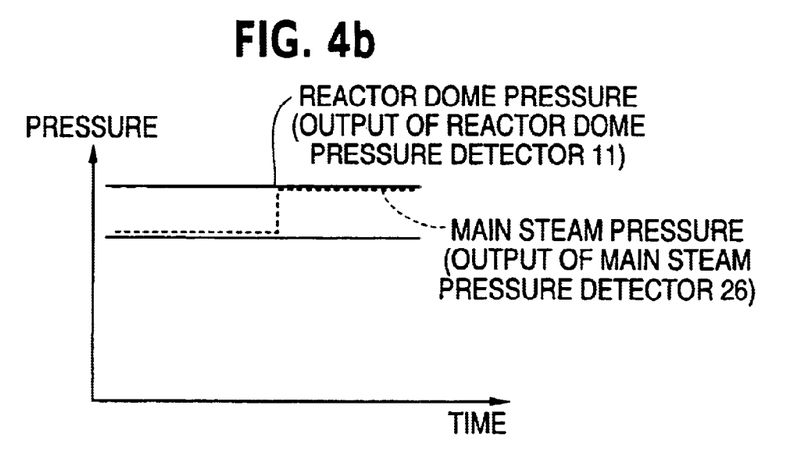
FIG. 4b is a chart of reactor dome pressure and main steam pressure in the first embodiment of the invention described in FIG. 1.

FIGS. 4a–4b are signal time charts for explaining the function and effect of the second embodiment. The ordinate axis shows pressure and the abscissa axis shows time. FIG. 4a is a signal time chart of the reactor dome pressure and the main steam pressure for explaining the function and effect of the second embodiment of this invention described in FIG. 3. FIG. 4b is a chart of the reactor dome pressure and the main steam pressure in the first embodiment of this invention described in FIG. 1.

In the second embodiment, once the pressure control change trigger signal 38 does not exist after the main steam isolation valves 2 are refully closed, the pressure control signal 29 changes over from the main steam pressure control signal 37 to the reactor dome pressure control signal 36 by the pressure control signal changeover unit 33.

If there is non-zero deviation between the main steam pressure control signal 37 and the reactor dome pressure control signal 36 at this time, the pressure control signal 29 changes abruptly according to the deviation, and the reactor dome pressure can be changed as shown in FIG. 4b according to the first embodiment of this invention.

To the contrary, according to the second embodiment as shown in FIG. 3, the pressure control signal 29 can change over stably and restrain the change of the reactor dome pressure as shown in FIG. 4a, by adding the deviation between the pressure control signal 29 and the reactor dome pressure control signal 36 as bias to the reactor dome pressure control signal 36 side and by decreasing the bias by a certain rate of changeover gradually.

Figure 5:
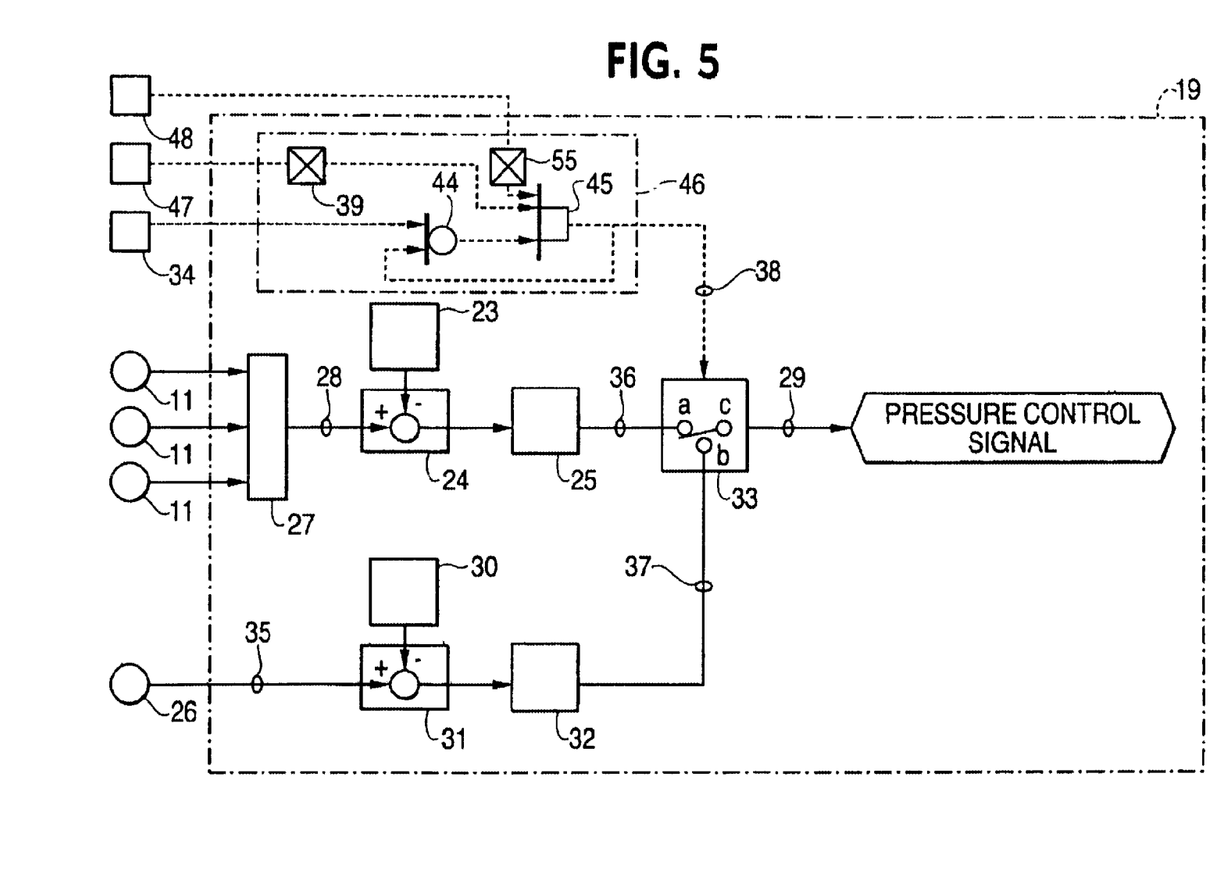
FIG. 5 is a block flow diagram of a steam turbine control device of a nuclear power plant according to a third embodiment of the invention.

FIG. 5 is a block flow diagram showing a third embodiment of the present invention. In this embodiment, the steam turbine control device in the above-mentioned embodiments, as shown in FIG. 1 or FIG. 3, further comprises a holding means for holding the pressure control change trigger signal 38 by the signal of the main steam isolation valve fully closed position detector 34 and a canceling means for canceling the pressure control change trigger signal 38 by manual operation or the signal of the main steam isolation valve fully open position detector 48.

In the third embodiment, the main steam control device further comprises a self-holding means 46 to hold the pressure control trigger signal 38 which is once in an ON state, having a first NOT circuit (logic reverse unit) 39, an OR circuit 44, and an AND circuit 45. A manual reset operation unit 47 outputs a signal to the AND circuit 45 of the self-holding means 46 so that the self-holding state of the self-holding means 46 can be canceled This situation as mentioned above shows an example in this embodiment where the main steam isolation valve fully position state detector 48, that detects the fully open position of the main steam isolation valves 2, is not included.

In the third embodiment described above, it is possible to hold the state that the pressure control change trigger signal 38 is in an ON state and the pressure control signal 29 is changed over to the main steam pressure control signal 37, and it is also possible to cancel the pressure control change trigger signal 38 by the manual reset operation unit 47. So it is enabled to change over the pressure control signal 29 to the reactor dome pressure control signal 36 side manually according to the judgment of the operating staff.

We may, in the third embodiment shown in FIG. 5, transpose the manual reset operation unit 47 for the series circuit of the main steam isolation value fully open position detector 48 and a second NOT circuit 55, to cancel the self-holding means 46.

In the third embodiment described above, it is possible to hold the state that the pressure control change trigger signal 38 is in an ON state and the pressure control signal 29 is changed over to the main steam pressure control signal 37, and it is also possible to cancel the pressure control change trigger signal 38 when the main steam isolation valves 2 are fully opened. The pressure control signal 29 can be changed over to the reactor dome pressure control signal 36 side automatically when the main steam isolation valves 2 are detected to be fully open.

Figure 6:
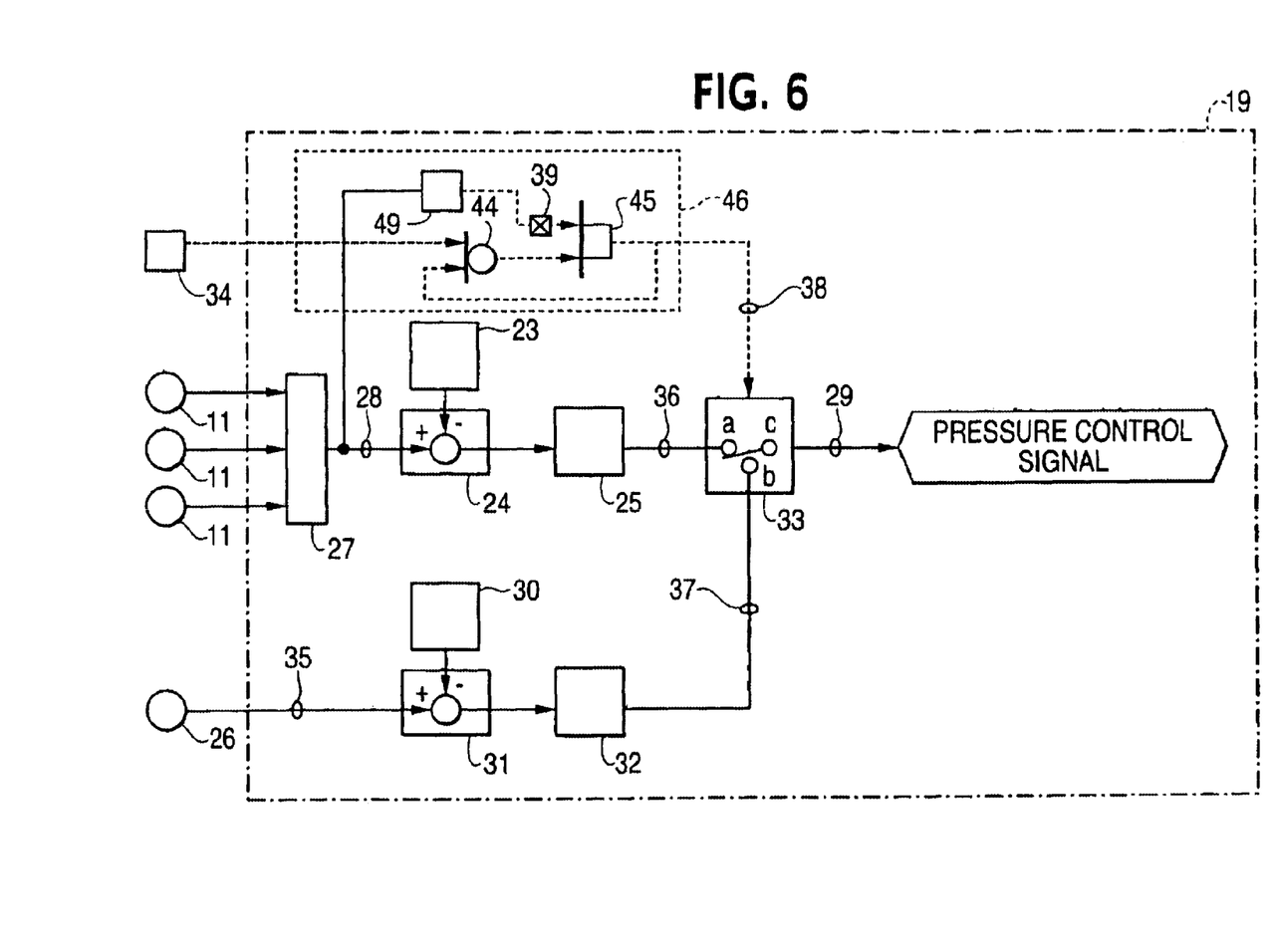
FIG. 6 is a block flow diagram of a steam turbine control device of a nuclear power plant according to a fourth embodiment of the invention.

FIG. 6 is a block flow diagram showing a fourth embodiment of the present invention. In this embodiment, in the steam turbine control device as mentioned in the third embodiment shown in FIG. 5, the manual reset operation unit 47 is substituted for a series circuit of a pressure switch 49 and a NOT circuit 39 to cancel the signal of self-holding means 46. The pressure switch 49 is activated when a pressure signal input is less than and equal to a pressure setting α, wherein α is a fixed value that is enough to be decompressed, for example, 1 MPa. The pressure switch 49 detects the reactor dome pressure signal 28 is not more than a fixed value α. A canceling means cancels the pressure control change trigger signal 38 when the reactor dome pressure falls to be equal to and less than a enough to be decompressed.

In this embodiment, it is possible to hold the state that the pressure control change trigger signal 38 is in an ON state and the pressure control signal 29 is changed over to the main steam pressure control signal 37. After that, the nuclear reactor 1 is to be decompressed for a shutdown operation of the nuclear reactor 1. It is thus possible to cancel the pressure control change trigger signal 38 when the decompression operation of the nuclear reactor 1 is detected to be finished, and then the pressure control signal 29 can be changed over to the reactor dome pressure control signal 36 automatically with a shutdown operation of the nuclear reactor 1.

Figure 7:
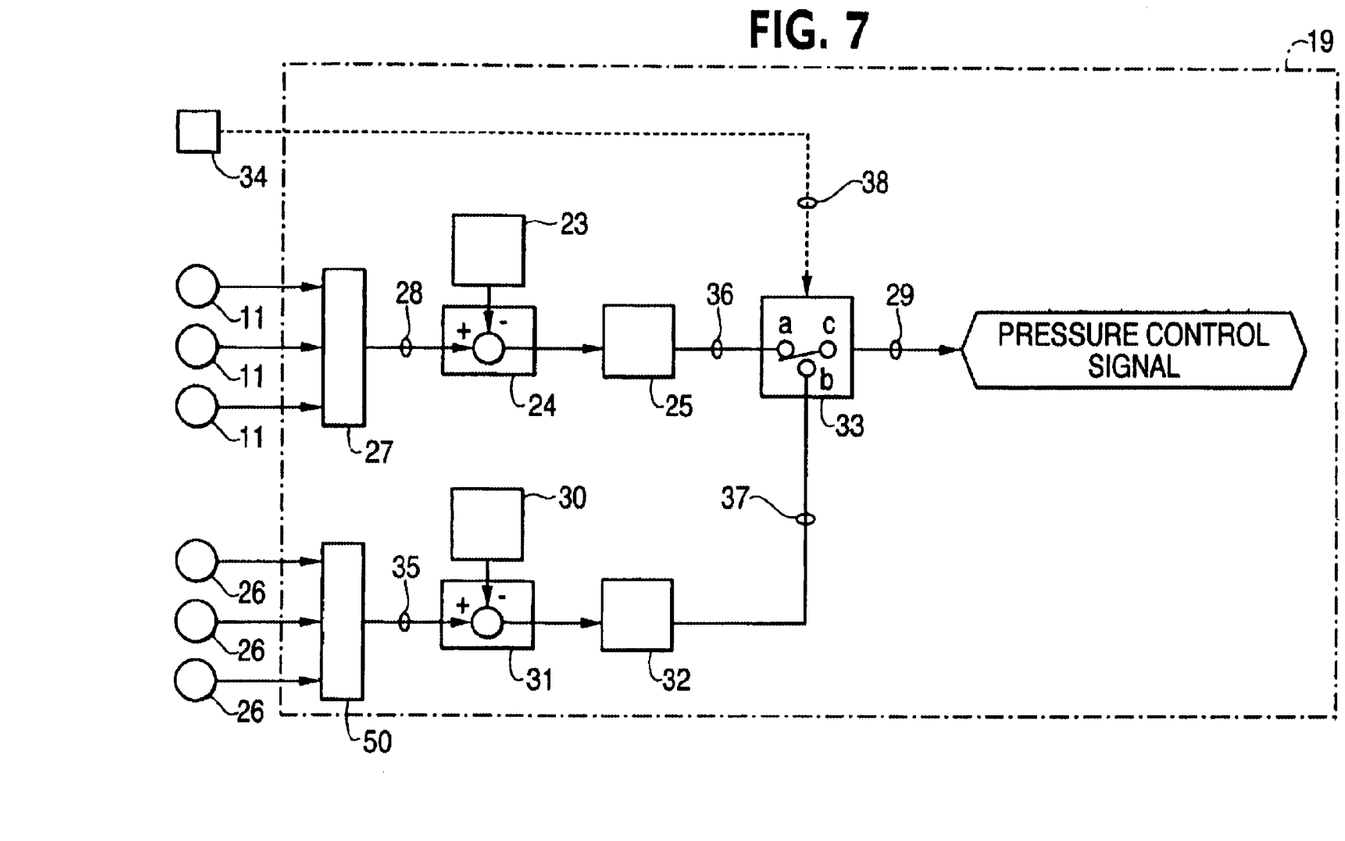
FIG. 7 is a block flow diagram of a steam turbine control device of a nuclear power plant according to a fifth embodiment of the invention.

FIG. 7 is a block flow diagram showing a fifth embodiment of the present invention. In this embodiment, the steam turbine pressure detectors 26 in the steam turbine control device in the first or second embodiment shown in FIG. 1 or FIG. 3 are multiple, two or three. Specifically, in this embodiment, two main steam pressure detectors 26 and the second medium value selector 50 are added to the construction of the above-mentioned embodiments, and the main steam pressure signal 35 is replaced by the signal of medium value selected by the second medium value selector 50 from the triplex main steam pressure detectors 26.

In this embodiment, even when the main steam isolation valves 2 are fully closed and one system breaks down among three systems of the main steam pressure detectors 26, the main steam pressure signal 35 is normally outputted to the second pressure deviation calculating unit 31.

In the fifth embodiment, three sets of the main steam pressure detectors 26 may be replaced by two sets of the main steam pressure detectors 26, and the second medium value selector 50 may be replaced by a high value selector 51 (not shown) which chooses the high value of the outputs of the two main steam pressure detectors 26. In this case, the main steam pressure signal 35 is replaced by the signal of the higher value chosen by the high value selector 51 among the signals from the doubled main steam pressure detectors 26. In this structure, even when the main steam isolation valves 2 are fully closed and one system breaks down between two systems of the main steam pressure detectors 26, a fall in the main steam pressure signal 35 can be restrained.

This invention is not limited to these embodiments described above.

For example, a state indicator may display the changeover state of the contact of the pressure control signal changeover unit 33 in the first or second embodiments shown in FIG. 1 or FIG. 3. This structure enables an operating staff to recognize the changeover state of the pressure control signal 29 easily.

With the form of the embodiments described above, the means to restrain the fall in the main steam pressure when the main steam isolation valves 2 are closed is constructed by the means to change over the pressure control signal 29 from the reactor dome pressure control signal 36 to the main steam pressure control signal 37 For example, the pressure control signal changeover unit 33 can be replaced by a control means to control the main steam control valve 6 and/or the turbine by-pass valve 7 shown in FIG. 8 when the main steam isolation valves 2 are fully closed.

Furthermore, in the third embodiment shown in FIG. 5, the inputs of the self-holding means 46 have two signals of the main steam isolation valve fully closed position detector 34 and one of the manual reset operation unit 47 and the main steam isolation valve fully open position detector 48, which can be replaced by the three signals of the main steam isolation valve fully closed position detector 34, the manual reset operation unit 47, and the main steam isolation valve fully open position detector 48.

And the input of the AND circuit 45 in the third embodiment shown in FIG. 5 may further comprise the input of a series circuit of the NOT circuit 39 and the pressure switch 49 described in the fourth embodiment shown in FIG. 6. In this case, the reactor pressure signal 28 may be inputted to the other end of the series circuit of the NOT circuit 39 and the pressure switch 49.

Moreover, although the third, fourth, and fifth embodiments shown in FIGS. 5, 6, and 7 explain the case where the first embodiment shown in FIG. 1 is used as a base, which can similarly explain the case where the second embodiment shown in FIG. 3 is used as a base.

Furthermore, at least one of the speed/load control calculating unit 15, the load limiter 16, the maximum discharge restriction unit 17, the first and second low value selectors 18 and 22, the first and second deviation calculating units 20 and 21, the reactor dome pressure setter 23, the first and second pressure deviation calculating units 24 and 31, the reactor dome pressure control calculating unit 25, the first and second medium value selectors 27 and 50, the main steam pressure setter 30, the main steam pressure control calculating unit 32, the pressure control signal change unit 33, the first and second NOT circuits 39 and 55, the one-shot circuit 40, the bias signal generator 41, the relay contact 42, the pressure control deviation calculating unit 43, the OR circuit 44, the AND circuit 45, the manual reset operation unit 47, the pressure switch 49 activated when the pressure of its input signal is less than and equal to α, the high value selector 51, may be hardware or a stored program memory and a CPU (central processing unit) which can read the content of the memory and calculate, or means similar to these.

The first and the second indicator are hardware; the means for displaying the state, the memory storing the state signal, the software program, and the CPU reading and processing the content of the memory; or means similar to these.

In the fifth embodiment shown in FIG. 7, the main steam pressure detectors 26 are doubled or tripled, but they may be multiple more than three.

While there has been particularly shown and described with reference to the preferred embodiment thereof, it will be understood by those skilled in the art that the foregoing and other changes in form and details can be made therein without departing from the spirit and scope of the present invention.

According to the present invention, since the main steam control valve and the turbine by-pass valve are fully closed when the main steam isolation valves are fully closed, it can be prevented to decrease abruptly the mass of the drive steam of the turbine grand steam evaporator, reactor feed water pump turbine, and the steam jet air ejector. The steam turbine control device of the nuclear power plant concerning this invention realizes to utilize the steam that remains in the main steam system effectively.

What is claimed is:

1. A steam turbine control device in a nuclear power plant comprising:
   a main steam system connected to lead steam generated in a nuclear reactor into a steam turbine comprising a main steam line, a main steam isolation valve, and a main steam control valve;
   a turbine by-pass system connected to by-pass the steam turbine, branched from the main steam system, and connected to a condenser, the turbine by-pass system comprising a turbine by-pass valve;
   a main steam pressure detector in the main steam system;
   a main steam pressure control calculating means, for outputting a main steam pressure control signal dependant on the signal from the main steam pressure detector;
   a reactor dome pressure detector in the nuclear reactor;
   a reactor dome pressure control calculating means for outputting a reactor dome pressure control signal dependent on the signal from the reactor dome pressure detector;

a main steam isolation valve fully closed position detector for outputting a pressure control change trigger signal when the main steam isolation valve is detected to be fully closed; and a pressure control signal calculating means for outputting a pressure control signal to control the position of the main steam control valve and/or the turbine by-pass valve comprising a pressure control signal changeover means to change over a pressure control signal from the reactor dome pressure control signal to the main steam pressure control signal when the main steam isolation valve is detected to be closed by the main steam isolation valve fully closed position detector.

2. The steam turbine control device according to claim 1, wherein the pressure control signal calculating means outputs; the pressure control signal to close the main steam control valve and/or the turbine by-pass valve when the main steam isolation valve is detected to be closed.

3. The steam turbine control device according to claim 1, further comprising;

a display means for displaying the signal changeover state depending on the signal of the pressure control signal changeover means.

4. In a nuclear power plant including a main steam isolation valve in a main steam system between a nuclear reactor and a steam turbine, a control device for controlling at least one of a first valve and a second valve, the first valve being in the main steam system and the second valve being in a steam turbine by-pass system branched from the main steam system, the control device comprising:

a first pressure monitor connected to the nuclear reactor;

a main steam isolation valve position monitor connected to the main steam isolation valve;

a second pressure monitor connected to the main steam system between the first valve and the main steam isolation valve;

a control means for controlling the position of the first valve or the second valve based on a first pressure signal from the first pressure monitor during normal operation of the nuclear reactor, and based on a second pressure signal from the second pressure monitor when the main steam isolation valve position monitor detects that the main steam isolation valve is closed.

5. The control device according to claim 4, wherein the controlling means fully closes the first and the second valves to stop steam from flowing into the steam turbine when the main steam isolation valve position monitor detects that the main steam isolation valve is closed.

* * * * *